United States Patent
Zhou et al.

(10) Patent No.: US 10,602,526 B2
(45) Date of Patent: Mar. 24, 2020

(54) SELECTING BASIC SERVICE SET COLOR VALUES

(71) Applicant: HEWLETT PACKARD ENTERPRISE DEVELOPMENT LP, Houston, TX (US)

(72) Inventors: Qiang Zhou, Beijing (CN); Guangzhi Ran, Beijing (CN); Jianpo Han, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/963,827

(22) Filed: Apr. 26, 2018

(65) Prior Publication Data

US 2019/0239232 A1 Aug. 1, 2019

(30) Foreign Application Priority Data

Jan. 31, 2018 (CN) .......................... 2018 1 0096483

(51) Int. Cl.
| | |
|---|---|
| *H04W 72/08* | (2009.01) |
| *H04B 17/318* | (2015.01) |
| *H04W 16/10* | (2009.01) |
| *H04W 84/12* | (2009.01) |
| *H04W 74/08* | (2009.01) |

(52) U.S. Cl.
CPC ........ *H04W 72/082* (2013.01); *H04B 17/318* (2015.01); *H04W 16/10* (2013.01); *H04W 74/0808* (2013.01); *H04W 84/12* (2013.01)

(58) Field of Classification Search
CPC ... H04W 72/082; H04W 84/12; H04B 17/318
See application file for complete search history.

(56) References Cited

U.S. PATENT DOCUMENTS

| | | | |
|---|---|---|---|
| 7,599,714 | B2 | 10/2009 | Kuzminskiy |
| 9,019,936 | B2 | 4/2015 | Backes |
| 9,585,143 | B2 | 2/2017 | Tang et al. |
| 1,570,016 | A1 | 9/2017 | Hahn et al. |
| 1,579,674 | A1 | 10/2017 | Hahn et al. |
| 1,581,786 | A1 | 11/2017 | Hahn et al. |
| 2009/0080377 | A1 | 3/2009 | Ganguly et al. |
| 2011/0243020 | A1 | 10/2011 | Ponnuswamy |
| 2012/0119880 | A1 | 5/2012 | Ponnuswamy |

(Continued)

FOREIGN PATENT DOCUMENTS

| | | |
|---|---|---|
| WO | WO-2016112306 | 7/2016 |
| WO | WO-2017171788 | 10/2017 |

OTHER PUBLICATIONS

Cisco Meraki, 10 Pgs.

(Continued)

*Primary Examiner* — Michael Thier
*Assistant Examiner* — Brian P Cox
(74) *Attorney, Agent, or Firm* — Jaffery Watson Mendonsa & Hamilton (57) ABSTRACT

An example network device may include a processor to receive information of a set of devices including at least one network device; estimate interferences of available basic service set (BSS) color values in a specified channel, based on the received information; and select one BSS color value with the interference lower than others from the available BSS color values.

16 Claims, 10 Drawing Sheets

(56) References Cited

U.S. PATENT DOCUMENTS

| | | | |
|---|---|---|---|
| 2013/0237202 A1* | 9/2013 | Tokgoz | H04W 28/0289 |
| | | | 455/418 |
| 2014/0307704 A1 | 10/2014 | Arogyaswami | |
| 2015/0282043 A1 | 10/2015 | Fang et al. | |
| 2016/0037542 A1 | 2/2016 | Tang et al. | |
| 2016/0345258 A1 | 11/2016 | Zhou et al. | |
| 2016/0381591 A1 | 12/2016 | Lysejko et al. | |
| 2017/0048715 A1 | 2/2017 | Fan et al. | |
| 2017/0085461 A1 | 3/2017 | Zhou et al. | |
| 2017/0135131 A1* | 5/2017 | Hart | H04W 74/08 |
| 2017/0257817 A1 | 9/2017 | Itagaki et al. | |
| 2018/0084554 A1 | 3/2018 | Chu et al. | |
| 2018/0184285 A1* | 6/2018 | Patil | H04L 61/2038 |
| 2018/0270038 A1 | 9/2018 | Oteri et al. | |
| 2019/0124542 A1* | 4/2019 | Pandey | H04W 28/0252 |

OTHER PUBLICATIONS

Zhou et al., Selecting Basic Service Set Color Values, Jan. 31, 2018, 33 Pgs.
Selinis et al., Exploiting the Capture Effect on DSC and BSS Color in Dense IEEE 802.11ax Deployments , (Research Paper), 2017, 8 Pgs.
Yasuhiko Inoue, "Discussion on the Receiver Behavior for CCAC DSC with BSS Color", IEEE Draft, May 12, 2015, 802(2), pp. 1-13.
Koichi Ishihara, "Consideration of asynchronous interference in OBSS environment", IEEE Draft, Sep. 16, 2014, 802(1), pp. 1-10.
Geonjung Ko, "BSS Color Settings for a Multiple BSSID Set", IEEE Draft, Jan. 19, 2016, 802(2), pp. 1-10.
European Search Report and Search Opinion Received for EP Application No. 18174186.9, dated Nov. 27, 2018, 10 pages.

* cited by examiner

FIG. 1

| BSS ID | Channel | BSS color value | Average RSSI | The number of active frames |
|---|---|---|---|---|
| BSS 1 | 36 | 1 | -60 | 5000 |
| BSS 2 | 48 | 1 | -61 | 1000 |
| BSS 3 | 36 | 2 | -50 | 3000 |
| BSS 4 | 36 | 3 | -70 | 4000 |

FIG. 2

| 210 | 230 | 240 | 250 |
|---|---|---|---|
| BSS ID | BSS color value | Average RSSI | The number of active frames |
| BSS 1 | 1 | -60 | 5000 |
| BSS 3 | 2 | -50 | 3000 |
| BSS 4 | 3 | -70 | 4000 |

FIG. 3

| 260 | 270 |
|---|---|
| Available BSS color value | Interference |
| 1 | 50.8 |
| 2 | 37.5 |
| 3 | 51.6 |
| 4 | 0 |
| ............... | |
| 63 | 0 |

SELECTING BASIC SERVICE SET COLOR VALUES

CROSS-REFERENCE TO RELATED APPLICATIONS

This application claims priority to Chinese Patent Application No. 201810096483.8 filed on Jan. 31, 2018, the disclosure of which is incorporated herein in its entirety by reference.

BACKGROUND

Basic service set (BSS) color is provided as a field in wireless packets by IEEE 802.11 standards to improve the spatial reuse. There are totally 63 available values of the BSS colors that can be assigned in one channel. A user may use the BSS colors to recognize signals of various BSSs overlapping with each other, and may distinguish the signals of different BSSs.

DETAILED DESCRIPTION

BSS color values may be randomly assigned to network devices, e.g. access points (APs), operating in a channel. In some cases, the network does not work well due to the randomly assigned BSS color values.

In order to reduce a degradation of the network caused by random BSS color assignments, the BSS color values may be selected for a network device in an operating channel by considering an environment of the network, e.g. the operating channel of other network devices in the network, the assigned BSS color values of other network devices in the network, the influence other network devices in the network, and the busyness of the network, etc.

Based on environmental considerations about the network, the possible interference in the operating channel of a network device in the case of selecting each of the available BSS color values may be estimated. Accordingly, a BSS color value with a lower interference level may be selected for the network device, such that the interferences in the operating channel due to the BSS color assignment may be controlled at a low level.

In other words, when selecting the BSS color value for the network device, the information of other network devices in the network may be collected, and the possible interferences may be estimated based on the collected information that may reflect some aspects of the environment of the network. Based on the estimated interferences, the selected BSS color value for the network device may be prevented from being the one with a highest interference level in the available BSS color values, and may be the one with a desired low interference level.

In one example, a device comprising a processor to receive information of a set of devices including at least one network device; estimate interferences of available basic service set (BSS) color values in a specified channel, based on the received information; and select one BSS color value with the interference lower than others from the available BSS color values.

In another example, a method comprises receiving, by a processor of a device, information of a set of devices including at least one network device; estimating, by the processor, interferences of available basic service set (BSS) color values in a specified channel, based on the received information; and selecting, by the processor, one BSS color value with the interference lower than others from the available BSS color values.

In another example, a non-transitory computer readable storage medium stores instructions that, when executed by a processor of a device, causes the processor to receive information of a set of devices including at least one network device; estimate interferences of available basic service set (BSS) color values in a specified channel, based on the received information; and select one BSS color value with the interference lower than others from the available BSS color values.

As used herein, a "network device" generally includes a device that is adapted to transmit and/or receive signaling and to process information within such signaling and to provide wireless local area network services to a station (e.g., any data processing equipment such as a computer, cellular phone, personal digital assistant, tablet devices, etc.). The "network device" may include access points, data transfer devices, network switches, routers, controllers, etc. As used herein, an "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

It is appreciated that examples described herein below may include various components and features. Some of the components and features may be removed and/or modified without departing from a scope of the device, method and non-transitory computer readable storage medium for. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

Figure 1:
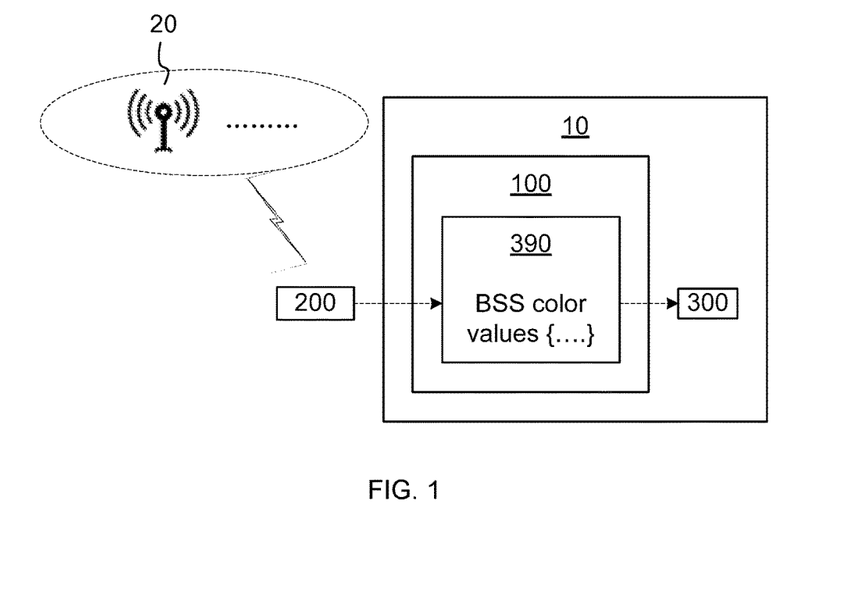
FIG. 1 is a block diagram illustrating an example wireless system according to present disclosure.

FIG. 1 is a block diagram illustrating an example wireless system according to present disclosure. Referring to FIG. 1, a wireless system, e.g. wireless local area networks (WLAN), includes a device 10, and a set of devices including at least one network device 20, such as an access point (AP).

The device 10 may include a processor 100. The processor 100 of the device 10 may receive information 200 of the set of devices including the network device 20. Generally, the information 200 may be collected by the device 10, or the information 200 may be also collected by other devices and transmitted to the device 10.

For example, the device 10 may collect the information 200 by scanning the channel for wireless signals transmitted from the set of the devices. In another example, one network device 20 in the set of devices may collect the information 200 of the set of the devices and transmit the collected information 200 to the device 10.

In one example, the information 200 may include: an operating channel of each network device 20 in the set of devices, a BSS color value of each network device 20 in the set of devices, a received signal strength indication (RSSI) of each network device 20 in the set of devices, and the number of active frames of each network device 20 in the set of devices (e.g., the frames received and transmitted by the network device 20 during a specified period).

The processor 100 of the device may also estimate interferences of available BSS color values in a specified channel, based on the received information of the set of devices including at least one network device 20.

In the case of the received information 200 including the operating channel of the network device 20, the BSS color value of the network device 20, the RSSI of the network device 20 and the number of active frames of the network device 20, the information 200 may be filtered to include the information of subset of the network devices operating in a same channel with a specified channel, and to exclude the information of other subset of the network devices operating in the channel different from the specified channel, according to the operating channel of the network devices 20 included in the information 200.

Based on the filtered information, the interference of each available BSS color value in the specified channel may be calculated by the equation (1) below.

$$\text{Int}(color\_i) = \Sigma \text{Int}(dev\_j)_{color\_i} \qquad \text{Equation (1):}$$

In other words, the interference $\text{Int}(color\_i)$ of the available BSS color value color_i in the specified channel may be a sum of interferences $\Sigma \text{Int}(dev\_j)_{color\_i}$ of the network devices dev_1~dev_m with that available BSS color value color_i in the that channel ($0 \leq i \leq 63$, $1 \leq j \leq m$, m is equal to or less than the number of the network devices 20 included in the set of the devices).

The interference $\text{Int}(dev\_i)_{color\_i}$ of each network device dev_j with that available BSS color value color_i may be calculated by the equation (2) below.

$$\text{Int}(dev\_j)_{color\_j} = |RSSI_{average\_dev\_j}| \times \theta1 + Ratio_{active\_dev\_j} \times \theta2 \qquad \text{Equation (2):}$$

In other words, the interference $\text{Int}(dev\_j)_{color\_i}$ of each network device dev_j is a sum of an absolute value $|RSSI_{average\_dev\_j}|$ of an average RSSI (e.g. an average value of the RSSIs of the network device dev_j during a specified period) of the network device dev_j associated with a first weight $\theta1$ and an active ratio $Ratio_{active\_dev\_j}$ of the network device dev_j with a second weight $\theta2$.

The first weight $\theta1$ and the second weight $\theta2$ may be predetermined, based on an expected ratio of the influence of the RSSI and the influence of the active ratio.

For example, when the wireless system is busy, the influence of the active ratio may be considered to have a higher level than the influence of the RSSI, and the second weight $\theta2$ may be predetermined to be higher than its reference value.

In another example, when the wireless system is idle, the influence of the RSSI may be considered to have a higher level than the influence of the active ratio, and the first weight $\theta1$ may be predetermined to be higher than its reference value.

In some cases, the average RSSI and the active ratio may be not at a same order of magnitude, or a difference between the order of magnitude of the average RSSI and the order of magnitude of the active ratio may be very large.

For example, the order of magnitude of the average RSSI of the network device dev_j may be not lower than $10^1$, and the active ratio $Ratio_{active\_dev\_j}$ of the network device dev_j may be a ratio of the active frames $Sum_{frame\_dev\_j}$ of the network device dev_j and the active frames $Sum_{frame\_all}$ of all network devices dev_1~dev_m (e.g. the sum of the frames received and transmitted by each network device during a specified period) operating in the specified channel and included in the set of devices, which may be calculated by the equation (3) below, such that the order of magnitude of the active ratio may be lower than $10^{-1}$.

$$Ratio_{active\_dev\_j} = \frac{Sum_{frame\_dev\_j}}{Sum_{frame\_all}} \qquad \text{Equation (3)}$$

When there is a large difference between the order of magnitude of the average RSSI and the order of magnitude of the active ratio, the first weight $\theta1$ and the second weight $\theta2$ may be predetermined to smooth the difference of the order of magnitude, e.g. by normalizing the average RSSI and the active ratio to a same order of magnitude.

Alternatively, the equation (2) may be transformed to be the equation (4) below, in which normalization coefficients c1 and c2 for smoothing the difference are independently provided.

$$\text{Int}(dev\_j)_{color\_i} = \frac{|RSSI_{average\_dev\_j}|}{c1} \times \theta1 + \frac{Ratio_{active\_dev\_j}}{c2} \times \theta2. \qquad \text{Equation (4)}$$

Based on the equation (4), the normalization may not be considered to be involved in the values of the first weight $\theta 1$ and the second weight $\theta 2$.

The processor 100 of the device 10 may select one BSS color value 300 with the interference lower than others from the available BSS color values 390. The selected BSS color 300 may be a value to be assigned.

Figure 2:
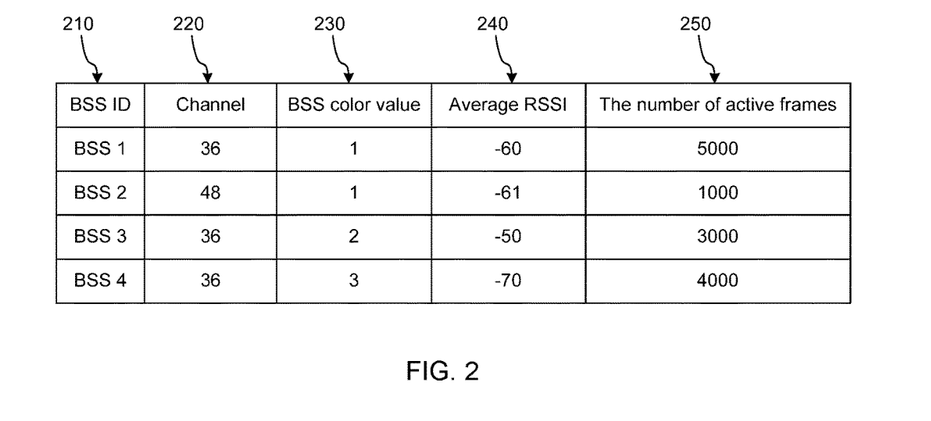
FIG. 2 is a diagram illustrating an example case of the collected information in the example wireless system according to present disclosure.

FIG. 2 is a diagram illustrating an example case of the collected information in the example wireless system according to present disclosure. Referring to FIG. 2, the information 200 received by the processor 100 of the device 10 may include the following fields: BSS ID 210, channel 220, BSS color 230, average RSSI 240 and the number of active frames 250. The field "BSS ID" 210 is a unique basic service set identifier associated with the network device 20, the field "channel" 220 indicates the operating channel of the network device 20, the field "BSS color" 230 indicates the assigned BSS color value of the network device 20 operating in the channel indicated by the channel 220, the field "average RSSI" 240 records an average value of the RSSIs of the network device 20 during a specified period, and the field "the number of active frames" 250 records the frames received and transmitted by the network device 20 during a specified period.

In the example shown in FIG. 2, the set of the devices may include four network devices with BSS ID "BSS1", "BSS2", "BSS3" and "BSS4", respectively. The network devices with BSS ID "BSS1", "BSS3" and "BSS4" operate in channel 36, which is the same with the specified channel.

Figure 3:
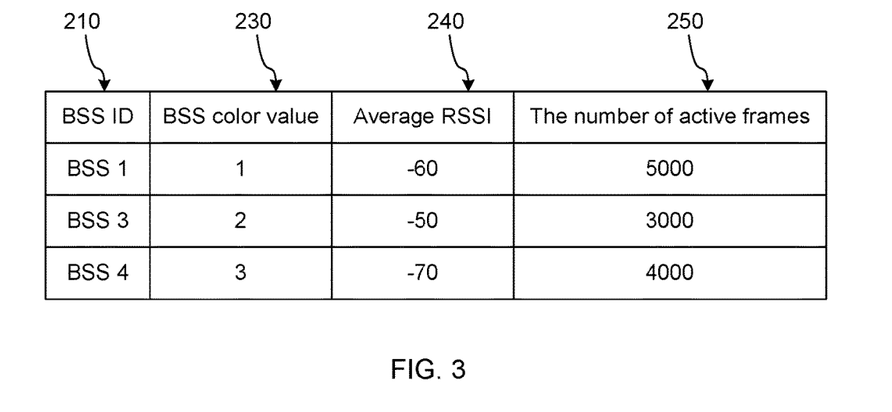
FIG. 3 is a diagram illustrating an example case of the filtered information in the example wireless system according to present disclosure.

FIG. 3 is a diagram illustrating an example case of the filtered information in the example wireless system according to present disclosure. Referring to FIG. 3, the information 200 received by the processor 100 of the device 10 may be filtered to exclude the information of the network devices with BSS ID "BSS2" operating in the channel 48, which is different from the specified channel, and the field "channel" 220 may be omitted.

Figure 4:
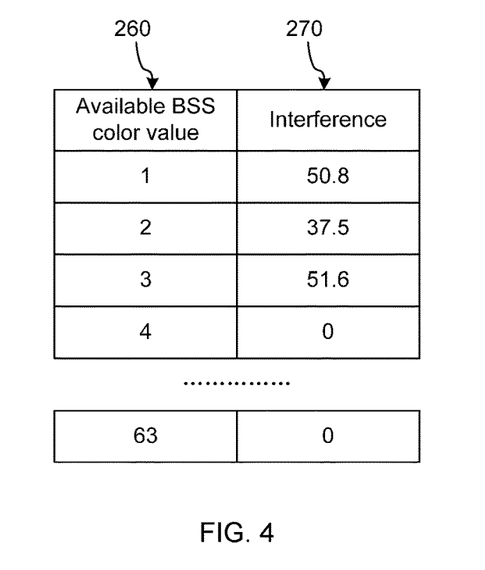
FIG. 4 is a diagram illustrating an example case of interferences of the available BSS color values in the example wireless system according to present disclosure.

FIG. 4 is a diagram illustrating an example case of interferences of the available BSS color values in the example wireless system according to present disclosure. Referring to FIG. 4, based on the filtered information as shown in FIG. 3, the interferences in the field "interference" 270 corresponding to one available BSS color values in the field "BSS color" 260 can be estimated.

For example, the interferences 270 may be estimated by equations (1), (4) and (3), the first weight $\theta 1$ and the second weight $\theta 2$ in equation (4) may be both "0.5", and the coefficients $c1$ and $c2$ in equation (4) may be "1" and "$10^{-2}$", respectively.

As shown in FIG. 4, the interference of BSS color value "1" is 50.8, the interference of BSS color value "2" is 37.5, the interference of BSS color value "3" is 51.6, and each of the interferences of BSS color values "4" to "63" is 0.

Based on the estimated interferences in the field "interference" 270 shown in FIG. 4, the processor 100 of the device 10 may select anyone of BSS color values "4" to "63" to assign.

Figure 5A:
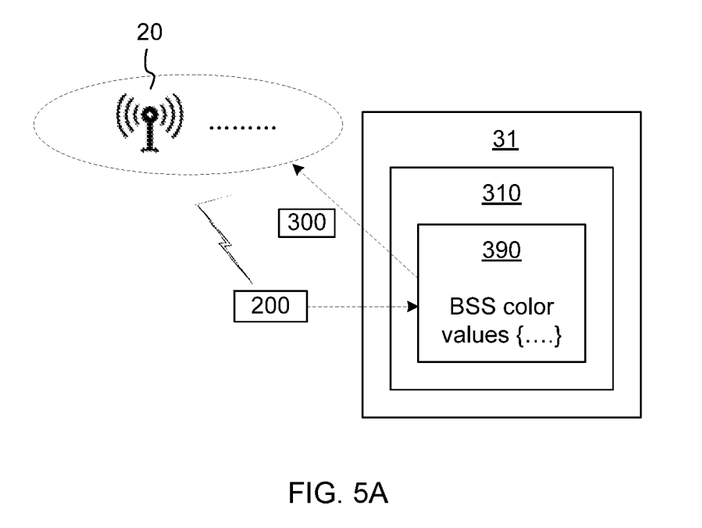
FIG. 5A and FIG. 5B are diagrams illustrating example cases of the device in the example wireless system according to present disclosure.
Figure 5B:
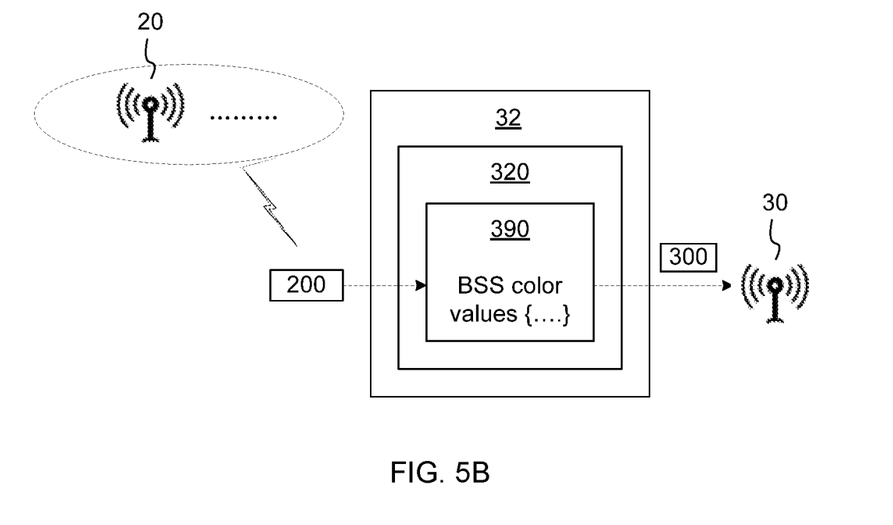

FIG. 5A and FIG. 5B are diagrams illustrating example cases of the device in the example wireless system according to present disclosure.

Referring to FIG. 5A, the device 31 may be a device capable of assigning a BSS color, such as a network controller, an access controller (AC), a cloud device, or an universal BSS color distributor.

The processor 310 of the device 31 of the example shown in FIG. 5A may estimate interferences of available BSS color values in the specified channel based on the received information 200, select one BSS color value 300 with the interference lower than others from the available BSS color values, and distribute the selected BSS color value 300 to network device 20 in the set of devices, which can operate in the specified channel, to update the BSS color value of the network device 20 in the set of devices.

Referring to FIG. 5B, the device 32 may be a device capable of assigning a BSS color, such as a network controller, an access controller (AC), a cloud device or an universal BSS color distributor.

The processor 320 of the device 32 of the example shown in FIG. 5B may estimate interferences of available BSS color values in the specified channel based on the received information 200, select one BSS color value 300 with the interference lower than others from the available BSS color values, and distribute the selected BSS color value 300 to another network device 30, which can operate in the specified channel, beyond the set of devices including the network device 20.

In other words, in the examples shown in FIG. 5A and FIG. 5B, the target to be assigned with the selected BSS color value 300 may be a network device different from the device 31 or 32.

Figure 6:
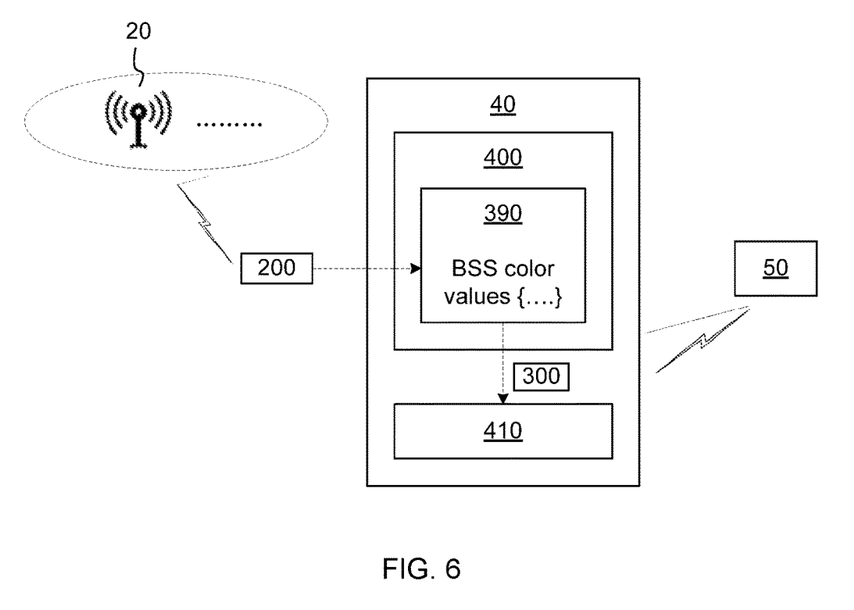
FIG. 6 is a diagram illustrating another example case of the device in the example wireless system according to present disclosure.

FIG. 6 is a diagram illustrating another example case of the device in the example wireless system according to present disclosure. Referring to FIG. 6, the device 40 may be a network device, such as an AP or any other device capable of transmitting wireless transmissions to and receiving wireless transmissions from a client device 50.

The client device 50 may be a smartphone, a mobile phone, a Personal Digital Assistant (PDA), a portable personal computer, an AIO (all-in-one) computing device, a notebook, a convertible or hybrid notebook, a netbook, a tablet, a cellular device, a desktop computer, a multimedia player, an entertainment unit, a data communication device, a portable reading device, or any other computing device capable of transmitting and receiving wireless transmissions.

The processor 400 of the network device 40 may estimate interferences of available BSS color values in the specified channel based on the received information 200, and select one BSS color value 300 with the interference lower than others from the available BSS color values.

In the example shown in FIG. 6, the target to be assigned with BSS color value 300 selected by the network device 40 may be its own, and the processor 400 of the network device 40 may further update BSS color settings 410 of the network device 40 by the selected BSS color value 300, such that the wireless transmissions between the network device 40 and the client device 50 in the specified channel may be identified by the selected BSS color value 300.

The network device 40 may have an initial or default BSS color value when powering on or joining in the wireless system and the information 200 may be collected by the network device 40 via scanning. When the rejection level between the BSS color value of the network devices 20 in the set of devices and the initial or default BSS color value of the network device 40 is high, the information 200 of the network devices 20 in the set of devices may be difficult to be collected by the processor 400 of the network device 40.

In order to prevent the collection of the network device 40 from missing the information 200 of the network device 20, the processor 400 of the network device 40 may further disable BSS color settings 410 (e.g. the initial or default BSS color value) during collecting the information 200.

Figure 7:
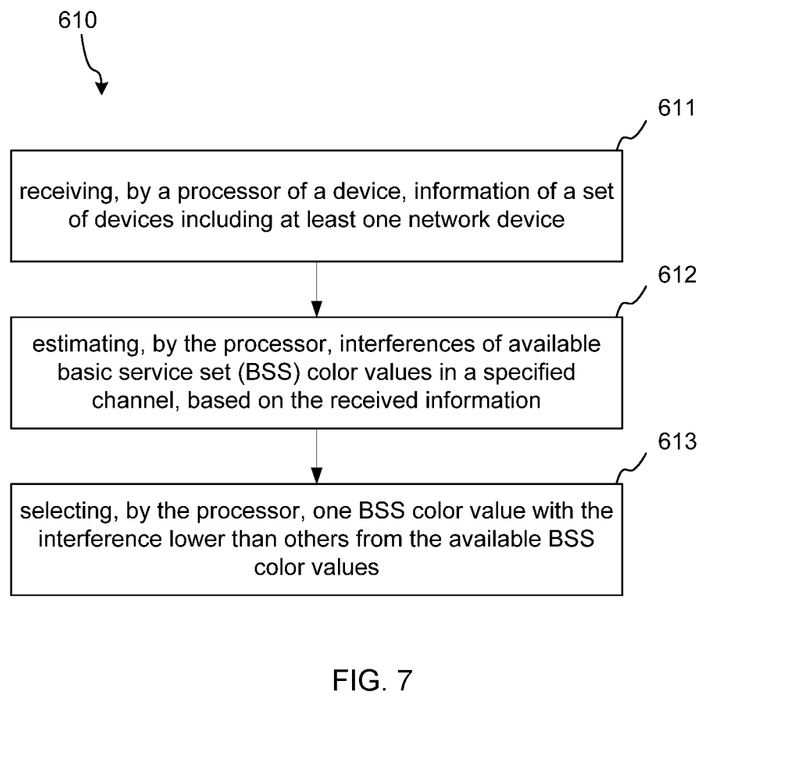
FIG. 7 is a flow chart illustrating an example method of automatically selecting BSS color value according to present disclosure.

FIG. 7 is a flow chart illustrating an example method of automatically selecting BSS color value according to present disclosure. Referring to FIG. 7:

The method 610 comprising: receiving, by a processor of a device, information of a set of devices including at least one network device, at 611.

In one example, the received information of the set of devices includes: an operating channel of each network device in the set of devices, a BSS color value of each network device in the set of devices, a RSSI of each network device in the set of devices, and the number of active frames of each network device in the set of devices (e.g. the frames received and transmitted by the network device during a specified period).

The method 610 comprising: estimating, by the processor, interferences of available basic service set (BSS) color values in a specified channel, based on the received information, at 612.

In one example, estimating interferences of available BSS color values in a specified channel may include: determining the interference of the network device by calculating a sum of an absolute value of an average RSSI of the network device associated with a first weight and an active ratio of the network device with a second weight, the active ratio of the network device is a ratio of the active frames of the network device and the active frames of all network devices operating in the specified channel and included in the set of devices, and determining the interference of each available BSS color value in the specified channel by calculating a sum of interferences of the network devices with that available BSS color value in the specified channel.

In another example, estimating interferences of available BSS color values in a specified channel may further include: normalizing the absolute value of an average RSSI of the network device and the active ratio of the network device, e.g. by utilizing normalization coefficients.

The method 610 comprising: selecting, by the processor, one BSS color value with the interference lower than others from the available BSS color values, at 613.

Figure 8:
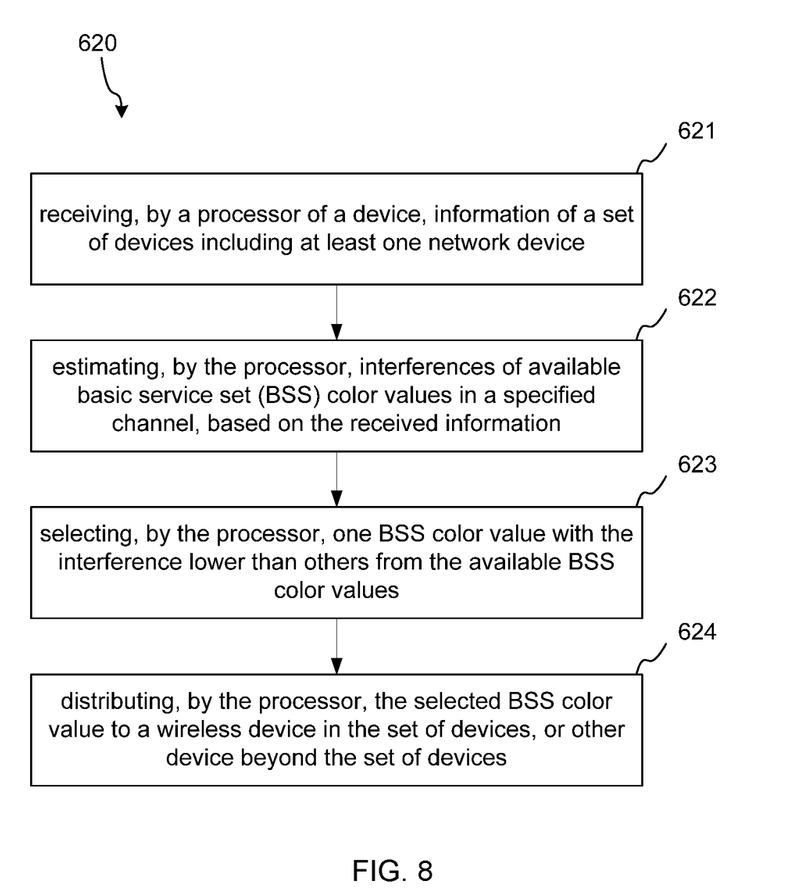
FIG. 8 is a flow chart illustrating another example method of automatically selecting BSS color value according to present disclosure.

FIG. 8 is a flow chart illustrating another example method of automatically selecting BSS color value according to present disclosure. Referring to FIG. 8:

The method 620 comprising: receiving, by a processor of a device, information of a set of devices including at least one network device, at 621.

In one example, the received information of the set of devices includes: an operating channel of each network device in the set of devices, a BSS color value of each network device in the set of devices, a RSSI of each network device in the set of devices, and the number of active frames of each network device in the set of devices (e.g. the frames received and transmitted by the network device during a specified period).

The method 620 comprising: estimating, by the processor, interferences of available basic service set (BSS) color values in a specified channel, based on the received information, at 622.

In one example, estimating interferences of available BSS color values in a specified channel may include: determining the interference of the network device by calculating a sum of an absolute value of an average RSSI of the network device associated with a first weight and an active ratio of the network device with a second weight, the active ratio of the network device is a ratio of the active frames of the network device and the active frames of all network devices working in the specified channel and included in the set of devices, and determining the interference of each available BSS color value in the specified channel by calculating a sum of interferences of the network devices with that available BSS color value in the specified channel.

In another example, estimating interferences of available BSS color values in a specified channel may further include: normalizing the absolute value of an average RS_SI of the network device and the active ratio of the network device, e.g. by utilizing normalization coefficients.

The method 620 comprising: selecting, by the processor, one BSS color value with the interference lower than others from the available BSS color values, at 623.

The method 620 comprising: distributing, by the processor, the selected BSS color value to a network device in the set of devices, or other device beyond the set of devices, at 624.

Figure 9:
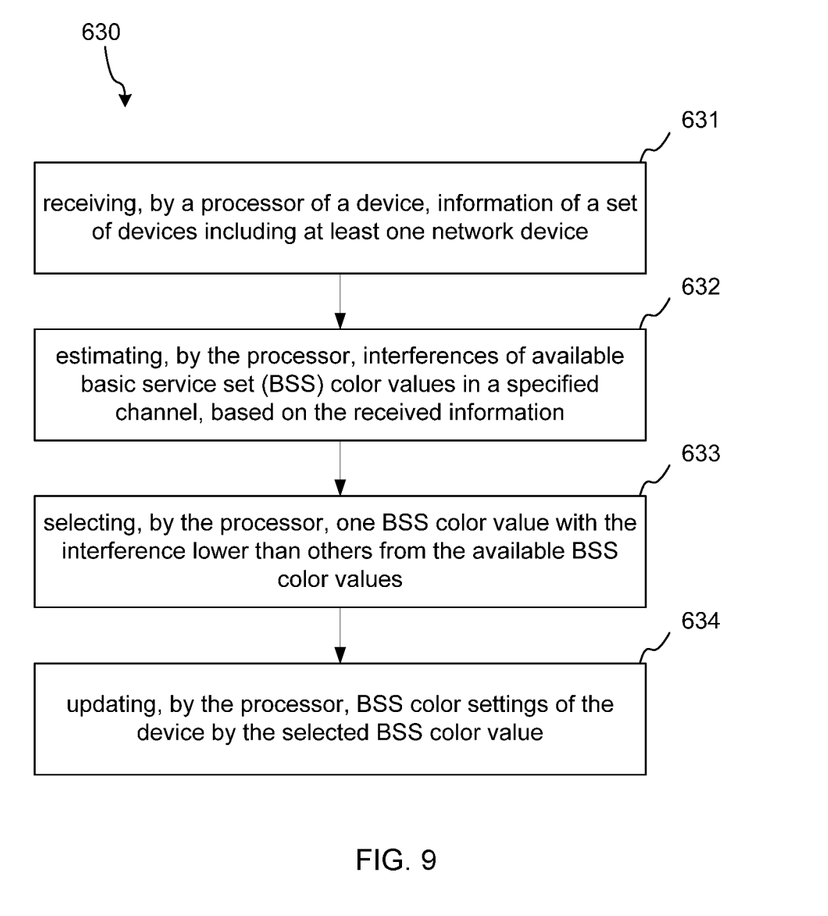
FIG. 9 is a flow chart illustrating another example method of automatically selecting BSS color value according to present disclosure.

FIG. 9 is a flow chart illustrating another example method of automatically selecting BSS color value according to present disclosure. Referring to FIG. 9:

The method 630 comprising: receiving, by a processor of a device, information of a set of devices including at least one network device, at 631.

In one example, the received information of the set of devices includes: an operating channel of each network device in the set of devices, a BSS color value of each network device in the set of devices, a RSSI of each network device in the set of devices, and the number of active frames of each network device in the set of devices (e.g. the frames received and transmitted by the network device during a specified period).

The receiving information of a set of devices including at least one network device may include: collecting, e.g. by scanning, the information of a set of devices including at least one network device, and disabling the BSS color settings of the device during collecting the information.

The method 630 comprising: estimating, by the processor, interferences of available basic service set (BSS) color values in a specified channel, based on the received information, at 632.

In one example, estimating interferences of available BSS color values in a specified channel may include: determining the interference of the network device by calculating a sum of an absolute value of an average RSSI of the network device associated with a first weight and an active ratio of the network device with a second weight, the active ratio of the network device is a ratio of the active frames of the network device and the active frames of all network devices operating in the specified channel and included in the set of devices, and determining the interference of each available BSS color value in the specified channel by calculating a sum of interferences of the network devices with that available BSS color value in the specified channel.

In another example, estimating interferences of available BSS color values in a specified channel may further include: normalizing the absolute value of an average RSSI of the network device and the active ratio of the network device, e.g. by utilizing normalization coefficients.

The method 630 comprising: selecting, by the processor, one BSS color value with the interference lower than others from the available BSS color values, at 633.

The method 630 comprising: updating, by the processor, BSS color settings of the device by the selected BSS color value, at 634.

Figure 10:
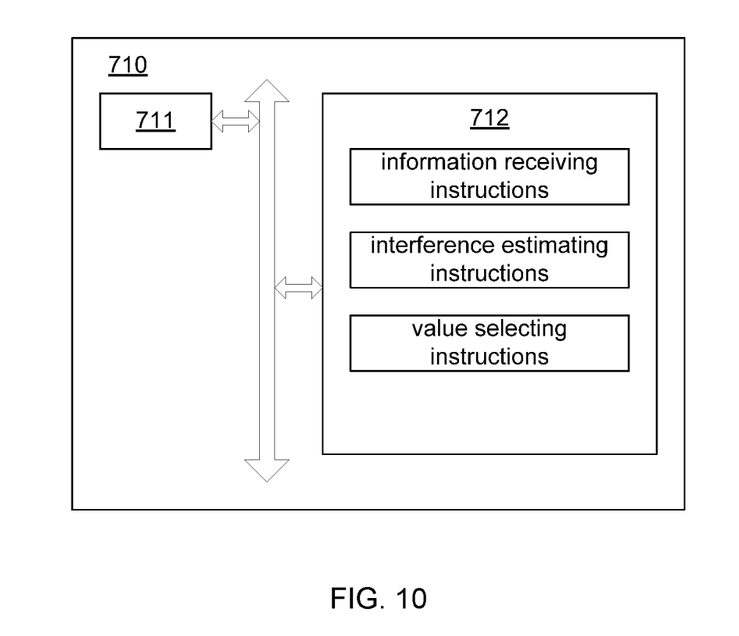
FIG. 10 is a block diagram illustrating an example device according to present disclosure.

FIG. 10 is a block diagram illustrating an example device according to present disclosure. Referring to FIG. 10, the device 710 includes a processor 711 and a non-transitory computer readable storage medium 712.

The non-transitory computer readable storage medium 712 may store instructions executable for the possessor 711.

The instructions include information receiving instructions that, when executed by the processor 711, may cause the processor 711 to receive information of a set of devices including at least one network device.

In one example, the information of the set of devices may include: an operating channel of each network device in the set of devices, a BSS color value of each network device in the set of devices, a RSSI of each network device in the set of devices, and the number of active frames of each network device in the set of devices (e.g. the frames received and transmitted by the network device during a specified period).

The instructions include interference estimating instructions that, when executed by the processor 711, may cause the processor 711 to estimate interferences of available BSS color values in a specified channel, based on the received information.

In one example, the interference of each available BSS color value in the specified channel estimated by the processor 711 executing the interference estimating instructions may be a sum of interferences of the network devices with that available BSS color value in the specified channel, the interference of the network device may be a sum of an absolute value of an average RSSI of the network device associated with a first weight and an active ratio of the network device with a second weight, and the active ratio of the network device may be a ratio of the active frames of the network device and the active frames of all network devices operating in the specified channel and included in the set of devices.

In another example, the absolute value of an average RSSI of the network device and the active ratio of the network device may be further normalized by the processor 711 executing the interference estimating instructions.

The instructions include value selecting instructions that, when executed by the processor 711, may cause the processor 711 to select one BSS color value with the interference lower than others from the available BSS color values.

Figure 11:
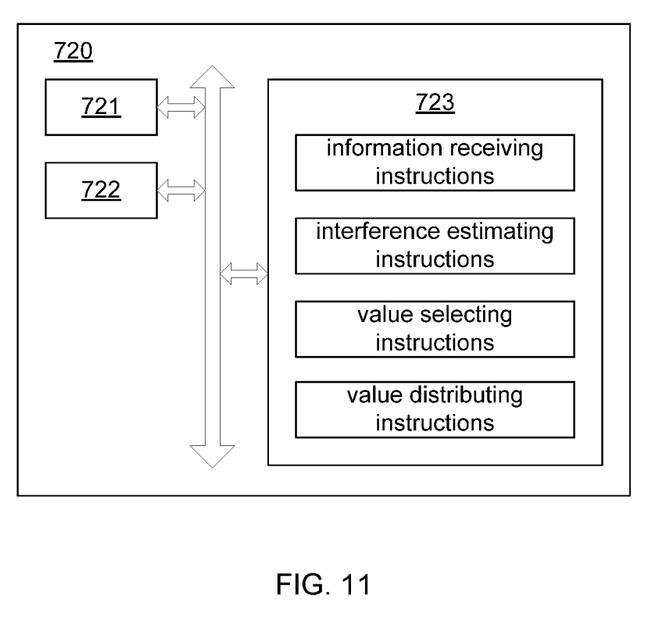
FIG. 11 is a block diagram illustrating another example device according to present disclosure.

FIG. 11 is a block diagram illustrating another example device according to present disclosure. Referring to FIG. 11, the device 720 includes a radio frequency (RF) transceiver 721, a processor 722 and a non-transitory computer readable storage medium 723.

The non-transitory computer readable storage medium 723 may store instructions executable for the possessor 722.

The instructions include information receiving instructions that, when executed by the processor 722, may cause the processor 722 to receive information of a set of devices including at least one network device.

In one example, the information of the set of devices may include: an operating channel of each network device in the set of devices, a BSS color value of each network device in the set of devices, a RSSI of each network device in the set of devices, and the number of active frames of each network device in the set of devices (e.g. the frames received and transmitted by the network device during a specified period).

The instructions include interference estimating instructions that, when executed by the processor 722, may cause the processor 722 to estimate interferences of available BSS color values in a specified channel, based on the received information.

In one example, the interference of each available BSS color value in the specified channel estimated by the processor 722 executing the interference estimating instructions may be a sum of interferences of the network devices with that available BSS color value in the specified channel, the interference of the network device may be a sum of an absolute value of an average RSSI of the network device associated with a first weight and an active ratio of the network device with a second weight, and the active ratio of the network device may be a ratio of the active frames of the network device and the active frames of all network devices operating in the specified channel and included in the set of devices.

In another example, the absolute value of an average RSSI of the network device and the active ratio of the network device may be further normalized by the processor 722 executing the interference estimating instructions.

The instructions include value selecting instructions that, when executed by the processor 722, may cause the processor 722 to select one BSS color value with the interference lower than others from the available BSS color values.

The instructions include value distributing instructions that, when executed by the processor 722, may cause the processor 722 to distribute the selected BSS color value to a network device in the set of devices, or other network device beyond the set of devices, e.g. by utilizing the RF transceiver 721.

Figure 12:
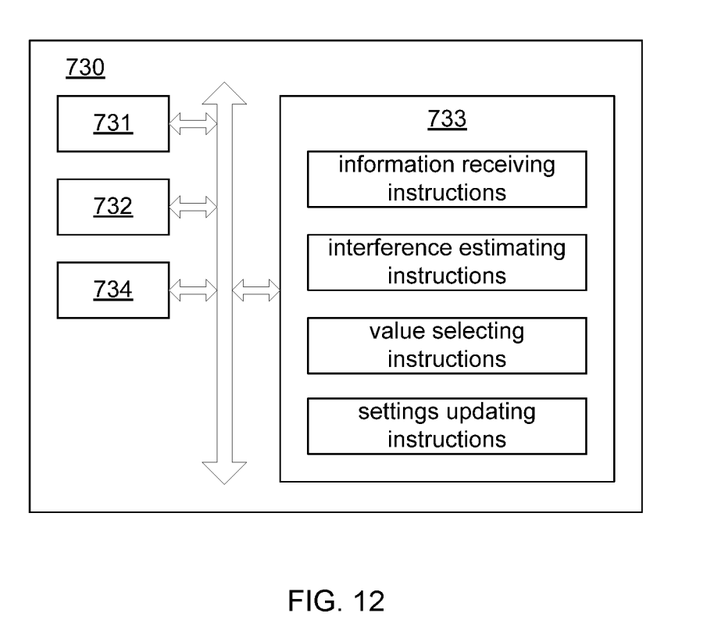
FIG. 12 is a block diagram illustrating an example network device according to present disclosure.

FIG. 12 is a block diagram illustrating another example network device according to present disclosure. Referring to FIG. 12, the network device 730 includes a radio frequency transceiver 731, a processor 732, a non-transitory computer readable storage medium 733 and a memory 734.

The non-transitory computer readable storage medium 733 may store instructions executable for the possessor 732, and the memory 734 may store the BSS color settings of the network device 730.

The instructions include information receiving instructions that, when executed by the processor 732, may cause the processor 732 to receive information of a set of devices including at least one network device.

In one example, the information of the set of devices may include: an operating channel of each network device in the set of devices, a BSS color value of each network device in the set of devices, a RSSI of each network device in the set of devices, and the number of active frames of each network device in the set of devices (e.g. the frames received and transmitted by the network device during a specified period).

In another example, the information receiving instructions that, when executed by the processor 732, may further cause the processor 732 to collect the information, and disable the BSS color settings of the network device 730 during collecting the information.

The instructions include interference estimating instructions, when executed by the processor 732, may cause the processor 732 to estimate interferences of available BSS color values in a specified channel, based on the received information.

In one example, the interference of each available BSS color value in the specified channel estimated by the processor 732 executing the interference estimating instructions may be a sum of interferences of the network devices with that available BSS color value in the specified channel, the interference of the network device may be a sum of an absolute value of an average RSSI of the network device associated with a first weight and an active ratio of the network device with a second weight, and the active ratio of the network device may be a ratio of the active frames of the network device and the active frames of all network devices operating in the specified channel and included in the set of devices.

In another example, the absolute value of an average RSSI of the network device and the active ratio of the network device may be further normalized by the processor 732 executing the interference estimating instructions.

The instructions include value selecting instructions that, when executed by the processor 732, may cause the processor 732 to select one BSS color value with the interference lower than others from the available BSS color values.

The instructions include settings updating instructions that, when executed by the processor 732, may cause the processor 732 to update BSS color settings of the network device 730 with the selected BSS color value.

While the present disclosure has been described in connection with certain example embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A device comprising a processor to:
   receive information of a set of devices including at least one network device, wherein the received information of the set of devices includes an operating channel of each network device in the set of devices, a basic service set (BSS) color value of each network device in the set of devices, a received signal strength indication (RSSI) of each network device in the set of devices, and a number of active frames of each network device in the set of devices during a particular period;
   estimate interferences for each available BSS color value of a plurality of available BSS color values in a specified channel, based on (i) an interference of each network device in the set of devices as a function of the RSSI and (ii) an active ratio during the particular period, wherein the active ratio of a particular network device in the set of devices is a ratio of the number of active frames of the particular network device and a number of active frames of all network devices working in the specified channel; and
   select a BSS color value of the plurality of available BSS color values with an estimated interference lower than estimated interferences of others from the plurality of available BSS color values.

2. The device of claim 1,
   wherein the estimated interference for a particular available BSS color value of the plurality of available BSS color values in the specified channel is a sum of interferences of each network device in the set of devices with the particular available BSS color value in the specified channel, and
   wherein the interference of the particular network device is a sum of an absolute value of an average RSSI of the particular network device during the particular period associated with a first weight and the active ratio of the particular network device with a second weight, and.

3. The device of claim 1,
   wherein the estimated interference for a particular available BSS color value of the plurality of available BSS color values in the specified channel is a sum of interferences of each network device in the set of devices with the particular available BSS color value in the specified channel, and
   wherein the interference of a particular network device is a sum of a normalized absolute value of an average RSSI of the particular network device associated with a first weight and a normalized value of the active ratio of the particular network device with a second weight.

4. The device of claim 1, wherein the processor is further to:
   distribute the selected BSS color value to a network device in the set of devices, or other network device beyond the set of devices.

5. The device of claim 1, wherein the processor is further to:
   update BSS color settings of the device by the selected BSS color value.

6. The device of claim 5, wherein the processor is further to:
   collect the information of the set of devices, and
   disable the BSS color settings of the device during collecting the information.

7. A method comprising:
   receiving, by a processor of a device, information of a set of devices including at least one network device, wherein the received information of the set of devices includes an operating channel of each network device in the set of devices, a basic service set (BSS) color value of each network device in the set of devices, a received signal strength indication (RSSI) of each network device in the set of devices, and a number of active frames of each network device in the set of devices during a particular period;
   estimating, by the processor, interferences for each available BSS color value of a plurality of available BSS color values in a specified channel, based on (i) an interference of each network device in the set of devices as a function of the RSSI and (ii) an active ratio during the particular period, wherein the active ratio of a particular network device in the set of devices is a ratio of the number of active frames of the particular network device and a number of active frames of all network devices working in the specified channel; and
   selecting, by the processor, a BSS color value of the plurality of available BSS color values with an estimated interference lower than estimated interferences of others from the plurality of available BSS color values.

8. The method of claim 7, wherein said estimating, by the processor, interferences for each available BSS color value of a plurality of available BSS color values in a specified channel includes:
   determining the interference of the particular network device by calculating a sum of an absolute value of an average RSSI of the particular network device during the particular period associated with a first weight and the active ratio of the particular network device with a second weight, and
   determining the estimated interference for a particular available BSS color value of the plurality of available BSS color values in the specified channel by calculating a sum of interferences of each network device in the set of devices with the particular available BSS color value in the specified channel.

9. The method of claim 8, further comprising:
   normalizing the absolute value of the average RSSI of the particular network device during the particular period and the active ratio of the particular network device.

10. The method of claim 7, further comprising:
    distributing, by the processor, the selected BSS color value to a network device in the set of devices, or other device beyond the set of devices.

11. The method of claim 7, further comprising:
    updating, by the processor, BSS color settings of the device by the selected BSS color value.

12. A non-transitory computer readable storage medium storing instructions that, when executed by a processor of a device, cause the processor to:
- receive information of a set of devices including at least one network device, wherein the received information of the set of devices includes an operating channel of each network device in the set of devices, a basic service set (BSS) color value of each network device in the set of devices, a received signal strength indication (RSSI) of each network device in the set of devices, and a number of active frames of each network device in the set of devices during a particular period;
- estimate interferences for each available BSS color value of a plurality of available BSS color values in a specified channel, based on (i) an interference of each network device in the set of devices as a function of the RSSI and (ii) an active ratio during the particular period, wherein the active ratio of a particular network device in the set of devices is a ratio of the number of active frames of the particular network device and a number of active frames of all network devices working in the specified channel; and
- select a BSS color value of the plurality of available BSS color values with an estimated interference lower than estimated interferences of others from the plurality of available BSS color values.

13. The non-transitory computer readable storage medium of claim 12,
- wherein the estimated interference for a particular available BSS color value of the plurality of available BSS color values in the specified channel is a sum of interferences of each network device in the set of devices with the particular available BSS color value in the specified channel, and
- wherein the interference of the particular network device is a sum of an absolute value of an average RSSI of the particular network device during the particular period associated with a first weight and the active ratio of the particular network device with a second weight.

14. The non-transitory computer readable storage medium of claim 12,
- wherein the estimated interference for a particular available BSS color value of the plurality of available BSS color values in the specified channel is a sum of interferences of each network device in the set of devices with the particular available BSS color value in the specified channel, and
- wherein the interference of the particular network device is a sum of a normalized absolute value of an average RSSI of the particular network device associated with a first weight and a normalized value of the active ratio of the particular network device with a second weight.

15. The non-transitory computer readable storage medium of claim 12, wherein the instructions further case the processor to:
- distribute the selected BSS color value to a network device in the set of devices, or other network device beyond the set of devices.

16. The non-transitory computer readable storage medium of claim 12, wherein the instructions further case the processor to:
- update BSS color settings of the device by the selected BSS color value.

* * * * *